(12) United States Patent
Yura

(10) Patent No.: US 11,431,036 B2
(45) Date of Patent: Aug. 30, 2022

(54) LITHIUM-ION ASSEMBLED BATTERY

(71) Applicant: NGK INSULATORS, LTD., Nagoya (JP)

(72) Inventor: Yukinobu Yura, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 156 days.

(21) Appl. No.: 16/803,185

(22) Filed: Feb. 27, 2020

(65) Prior Publication Data

US 2020/0194846 A1 Jun. 18, 2020

Related U.S. Application Data

(63) Continuation of application No. PCT/JP2018/033491, filed on Sep. 10, 2018.

(30) Foreign Application Priority Data

Sep. 26, 2017 (JP) .............................. JP2017-185433

(51) Int. Cl.
| | |
|---|---|
| *H01M 10/42* | (2006.01) |
| *H01M 4/485* | (2010.01) |
| *H01M 4/587* | (2010.01) |
| *H01M 10/0525* | (2010.01) |
| *H01M 4/02* | (2006.01) |

(52) U.S. Cl.
CPC ......... *H01M 10/425* (2013.01); *H01M 4/485* (2013.01); *H01M 4/587* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 9,209,451 B2 | 12/2015 | Fukushima | |
| 2011/0027646 A1* | 2/2011 | Lee | H01M 4/36 429/188 |
| 2012/0306507 A1* | 12/2012 | Fujimatsu | G01R 31/3835 324/434 |
| 2015/0380787 A1 | 12/2015 | Ishii et al. | |

FOREIGN PATENT DOCUMENTS

| | | |
|---|---|---|
| JP | 2002-042785 A1 | 2/2002 |
| JP | 2006-318074 A1 | 11/2006 |
| JP | 4234940 B2 | 3/2009 |
| JP | 2011-124166 A1 | 6/2011 |
| JP | 2013-011596 A1 | 1/2013 |
| JP | 5174283 B2 | 4/2013 |
| JP | 2014/142078 A1 | 9/2014 |
| JP | 2015-103370 A1 | 6/2015 |
| JP | 2015-185337 A1 | 10/2015 |

OTHER PUBLICATIONS

International Search Report and Written Opinion (Application No. PCT/JP2018/033491) dated Nov. 13, 2018 (with English transalation).
Japanese Office Action (Application No. 2019-544527) dated Apr. 14, 2021 (with English translation).

* cited by examiner

*Primary Examiner* — Wyatt P McConnell
(74) *Attorney, Agent, or Firm* — Burr & Brown, PLLC

(57) ABSTRACT

Provided is a lithium-ion assembled battery including a plurality of lithium-ion unit cells connected to each other in series, and Zener diodes connected to the respective unit cells in parallel, and the Zener diode is characterized in that a current of $\frac{1}{200}$ or less of a capacity of the unit cell flows at a mean voltage of the unit cell.

9 Claims, 3 Drawing Sheets

LITHIUM-ION ASSEMBLED BATTERY

CROSS-REFERENCE TO RELATED APPLICATIONS

This application is a continuation application of PCT/JP2018/033491 filed Sep. 10, 2018, which claims priority to Japanese Patent Application No. 2017-185433 filed Sep. 26, 2017, the entire contents all of which are incorporated herein by reference.

BACKGROUND OF THE INVENTION

1. Field of the Invention

The present invention relates to a lithium-ion assembled battery, and more specifically, to a lithium-ion assembled battery including a plurality of lithium-ion unit cells. The lithium-ion unit cell and the lithium-ion assembled battery each are also called a secondary lithium-ion battery.

2. Description of the Related Art

In applications requiring power supply with high-rate output, such as hybrid vehicles and electric vehicles, lithium-ion unit cells are, in general, connected in series into a battery module. However, such a battery module generates a variation in voltage among the unit cells due to variations in capacity, deterioration (caused by cycled use and storage) and self-discharge among the unit cells. Such a variation in voltage among the unit cells causes each unit cell to develop, for example, deterioration at an accelerated rate, overcharge and overdischarge, resulting in safety problems. Accordingly, a system for individually monitoring the voltages of unit cells is generally used in the battery module.

It is known to use Zener diodes for detecting a rise in terminal voltage due to an abnormal state in the battery, such as an overcharge state. In Zener diodes, a reverse current rapidly increases in the case that a voltage exceeds a certain reverse voltage (referred to as a Zener voltage or a breakdown voltage), but a terminal voltage barely changes even when a rapid increase in reverse current occurs. For example, PTL 1 (JP4234940B) discloses a secondary lithium battery including a voltage detection mechanism for detecting the arrival of a terminal voltage at a programmed voltage, and a bypass mechanism for forming a bypass current path and flowing current in conjunction with the detection of the arrival of the terminal voltage at the programmed voltage. In this patent, a Zener diode is proposed to be used in the voltage detection mechanism. In other words, the patent discloses that the connection of the Zener diode to a lithium-ion battery can prevent an increase in voltage by reverse current even if the terminal voltage exceeds the programmed voltage. In this patent, a Zener diode is used to detect an abnormal rise in terminal voltage exceeding a Zener voltage (a breakdown voltage).

In recent years, lithium titanate $Li_4Ti_5O_{12}$ (hereinafter, referred to as LTO) has attracted attention as a negative electrode material in a secondary lithium-ion battery. The LTO is advantageous in a smaller volume change accompanied by intercalation/deintercalation of lithium-ions, longer cycle life and higher safety compared to a carbon negative electrode, and a superior low-temperature operation when used in a negative electrode material of the secondary lithium battery. In particular, sintering of the LTO is proposed to achieve an enhancement in, for example, energy density. In other words, the use of sintered LTO is proposed in a positive electrode or a negative electrode of a secondary lithium battery. For example, PTL 2 (JP5174283B) discloses sintered LTO that has a mean pore diameter of 0.10 to 0.20 µm, a specific surface area of 1.0 to 3.0 $m^2/g$, and a relative density of 80 to 90%, and that contains crystalline particles of titanium oxide. PTL 3 (JP2002-42785A) discloses sintered LTO having a packing rate of 50 to 80% of active material and a thickness of more than 20 µm to 200 µm. PTL 4 (JP2015-185337A) discloses sintered LTO having a relative density of 90% or more and a grain diameter of 50 nm or more.

CITATION LIST

Patent Literatures

PTL1: JP4234940B
PTL2: JP5174283B
PTL3: JP2002-42785A
PTL4: JP2015-185337A

SUMMARY OF THE INVENTION

A battery module provided with a system for monitoring voltages of individual unit cells as described above has a large size; hence, this battery module is not suitable for applications of small lithium-ion batteries having, for example, a length of 50 mm or less, a width of 50 or less, and a thickness of 2 mm or less (i.e., applications that require small-size, low-profile, and space-saving). As proposed in PTL 1, a Zener diode can serve as a compact voltage detection mechanism. However, when a Zener diode having a Zener voltage corresponding to a programmed voltage is connected to a unit cell as provided, a large leakage current flows through the Zener diode even in a non-discharge state after stopping of charge, resulting in a decrease in capacity caused by the leakage current and reductions in storage characteristics accompanied thereby.

The present inventors have now found that by connecting a Zener diode, which has predetermined characteristics defined in accordance with a capacity of each lithium-ion unit cell, to each of lithium-ion unit cells in parallel, and connecting such unit cells provided with Zener diodes in series, it is possible to provide a lithium-ion assembled battery having a simple configuration that is capable of constantly and automatically correcting a variation in voltage and a variation in capacity among unit cells while minimizing a decrease in capacity and accompanying reductions in storage characteristics.

Accordingly, an object of the present invention is to provide a lithium-ion assembled battery having a simple configuration that is capable of constantly and automatically correcting a variation in voltage and a variation in capacity among unit cells while minimizing a decrease in capacity and accompanying reductions in storage characteristics.

According to an aspect of the present invention, there is provided a lithium-ion assembled battery comprising:

a plurality of lithium-ion unit cells connected to each other in series; and

Zener diodes connected to the respective unit cells in parallel, wherein the Zener diodes are each characterized in that a current of $1/200$ or less of a capacity of the unit cell flows at a mean voltage of the unit cell.

DETAILED DESCRIPTION OF THE INVENTION

Figure 1:
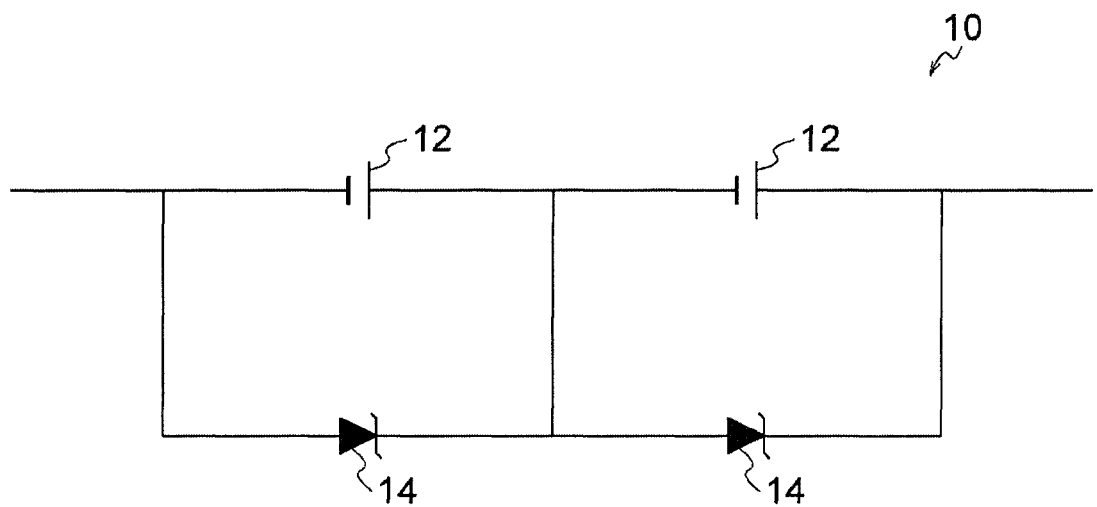
FIG. 1 is a circuit diagram illustrating an example of a lithium-ion assembled battery in the present invention.

FIG. 1 illustrates an example of the lithium-ion assembled battery in the present invention. As shown in FIG. 1, the lithium-ion assembled battery 10 includes a plurality of lithium-ion unit cells 12 and a plurality of Zener diodes 14. The lithium-ion unit cells 12 are connected to each other in series. The Zener diode 14 is connected to each of the unit cells 12 in parallel. The Zener diode 14 is characterized in that a current of $1/200$ or less (i.e., 0.005 or less) of the capacity of unit cell 12 flows at a mean voltage of unit cell 12. As described above, connecting a Zener diode 14, which has predetermined characteristics defined in accordance with a capacity of each lithium-ion unit cell 12, to each of the lithium-ion unit cells 12 in parallel, and connecting such unit cells 12 provided with Zener diodes 14 in series make it possible to provide a lithium-ion assembled battery having a simple configuration that is capable of constantly and automatically correcting a variation in voltage and a variation in capacity among unit cells while minimizing a decrease in capacity and accompanying reductions in storage characteristics.

In other words, power supply with high-rate output can be achieved through connection of lithium-ion unit cells in series into an assembled battery. However, in this case, control of only overall voltage in the assembled battery may readily cause a variation in voltage among the unit cells due to variations in capacity, deterioration and self-discharge of each unit cell as described above. Such a variation in voltage among the unit cells leads to safety problems, such as accelerated deterioration and occurrence of overcharge or overdischarge. Such a variation in voltage among the unit cells would not be generated if all properties, such as initial capacity, self-discharge rate and deterioration rate, were identical among the unit cells. Unfortunately, the unit cells having completely identical properties can be barely produced in the current technological level of manufacturing. Accordingly, a system or a cell balancer for monitoring and controlling the voltages of individual unit cells are conventionally used as a means for eliminating a variation in voltage among the unit cells. However, such a system or a cell balancer is a large-scale device, and is not suitable for applications of small lithium-ion batteries (i.e., applications that requires small, low-profile, and space-saving batteries), such as smart cards that incorporate small lithium-ion batteries (e.g., cards having fingerprint authentication/wireless communication functions provided with wireless communication ICs, ASICs for fingerprint analysis and fingerprint sensors), RFID tags that incorporate small lithium-ion batteries (e.g., RFID for management provided with IC circuits and antennas), and IoT modules that incorporate small lithium-ion batteries for, e.g., farm management, environmental management in factories and IC power supply. In this regard, since a typical Zener diode is a very small and simple device like a grain size of rice, the Zener diode is useful if it can reduce a variation in voltage among the unit cells in the assembled battery.

Figure 2:
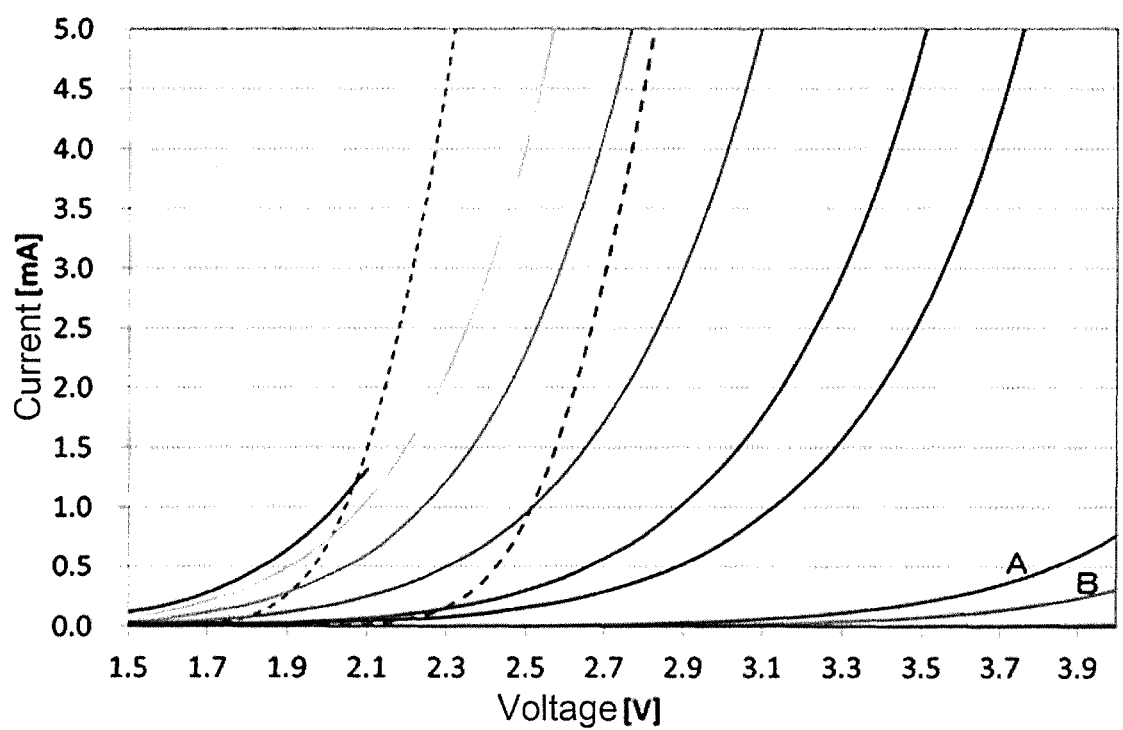
FIG. 2 is a diagram illustrating current-voltage characteristics of ten commercially available Zener diodes.

In the present invention, the connection of Zener diodes 14 in parallel to the respective lithium-ion unit cells 12 in the assembled battery 10 can reduce a variation in voltage among the unit cells 12. For example, in the case that the voltages of two unit cells 12 are different from each other in the assembled battery 10 including two unit cells 12 connected in series as shown in FIG. 1, a current flowing through one Zener diode 14 gets larger in one unit cell 12 having a higher voltage, and a current flowing through the other Zener diode 14 gets smaller in the other unit cell 12 having a lower voltage. Such a flow of current is based on characteristics of Zener diode, that is, a larger applied voltage causes a larger current flow as seen in FIG. 2, which illustrates the characteristics of various Zener diodes. The voltages of the two unit cells 12 are gradually balanced by a difference between the current values. As a result, the Zener diodes 14 operate such that the voltages of two unit cells 12 are constantly balanced and thereby a variation in voltage between the unit cells 12 is reduced. In other words, the Zener diodes 14 operate so as to constantly correct a variation in voltage between the unit cells 12, and can result in avoidance of overcharge and overdischarge. In addition, even when a variation in capacity occurs due to, for example, a difference of self-discharge among the unit cells 12, the Zener diodes 14 can automatically correct the variation, thereby avoiding deterioration in unit cells 12 that may occur in series connection.

However, not all Zener diodes are applicable in the present invention. As shown in FIG. 2, several Zener diodes having various characteristics are known. A Zener diode having a small leakage current is desirable because the Zener diode constantly discharges as a leakage current even except during charging. In this regard, the Zener diode 14 used in the present invention is characterized in that a current of $1/200$ or less of the capacity of unit cell 12 flows at the mean voltage of the unit cell 12. This small amount of current, which is $1/200$ or less, is mainly intended for use of the Zener diode in a voltage range lower than a Zener voltage (a breakdown voltage) where a rapid current increase occurs (i.e., a voltage range where only a small amount of current flows), but is not intended for use of the Zener diode for detecting an abnormal rise in terminal voltage exceeding the Zener voltage (the breakdown voltage) as disclosed in PTL 1. Since the operating time of unit cell corresponds to C/I (unit: $h^{-1}$) where the capacity of the unit cell 12 is C (Ah) and the current of the Zener diode 14 is I (A), a ratio of $1/200$ or less to the capacity of the unit cell 12 indicates that the unit cell can operate for about 200 hours or more (i.e., about 9 days or more) until the unit cell reaches a complete discharged state (SOC: 0%) due to leakage current in a rest state (without charge/discharge). In other words, the use of the Zener diode 14 that satisfies the characteristics mentioned above can minimize a decrease in capacity and accompanying reductions in storage characteristics while maintaining the voltage balance among the unit cells 12 even in a rest state of the unit cells 12.

Figure 3:
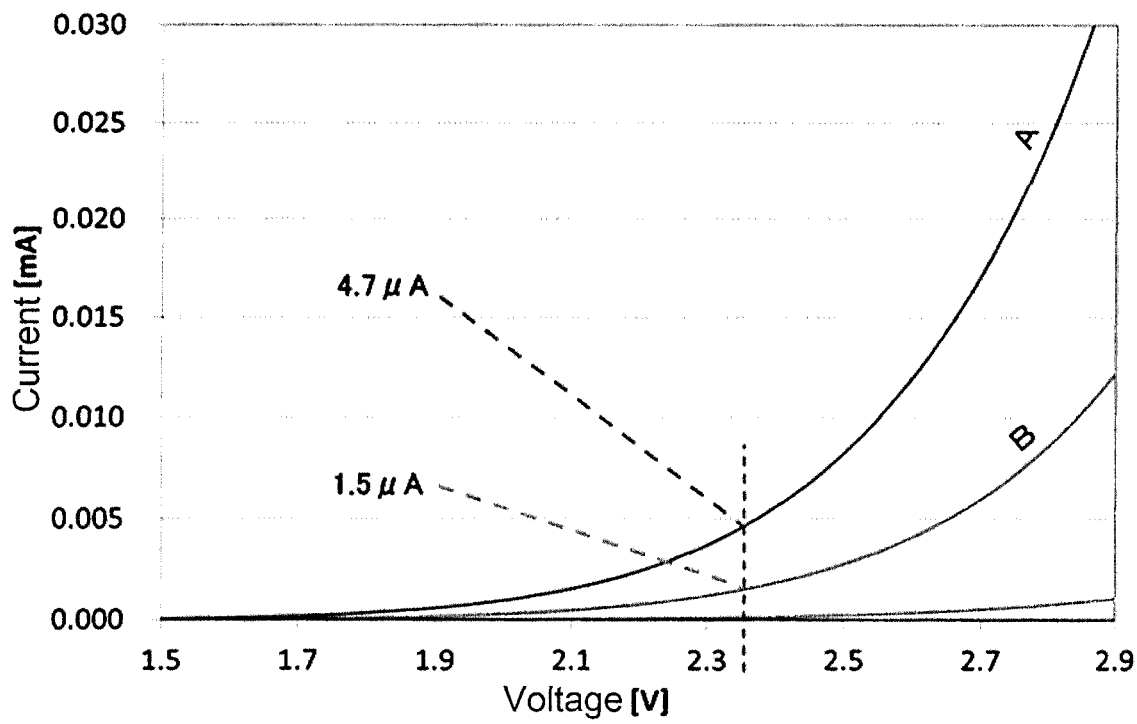
FIG. 3 is a diagram illustrating current-voltage characteristics of Zener diodes A and B shown in FIG. 2 in a range of 1.5 to 2.9 V.

For example, Zener diodes corresponding to characteristic curves denoted as A and B in FIG. 2 can be desired candidates for the unit cell 12 having a capacity of 3.0 mAh and a mean voltage of 2.36 V. As shown in FIG. 3, the Zener current of Zener diode A is 4.7 µA at a voltage of 2.36 V, and the time required for complete discharge of the unit cell having 3 mAh in a rest state is calculated to be approximately 27 days (i.e., 3 mAh/4.7 µA=638 hours=26.6 days).

Figure 4A:
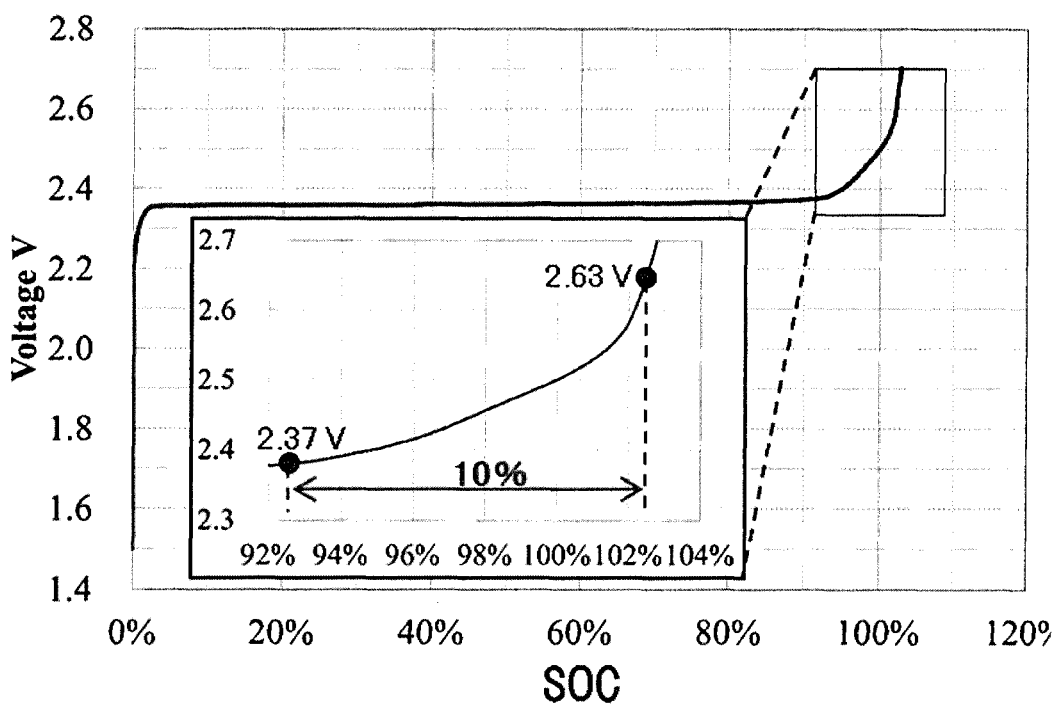
FIG. 4A is a charge/discharge curve of a lithium-ion unit cell having a capacity of 3 mAh.
Figure 4B:
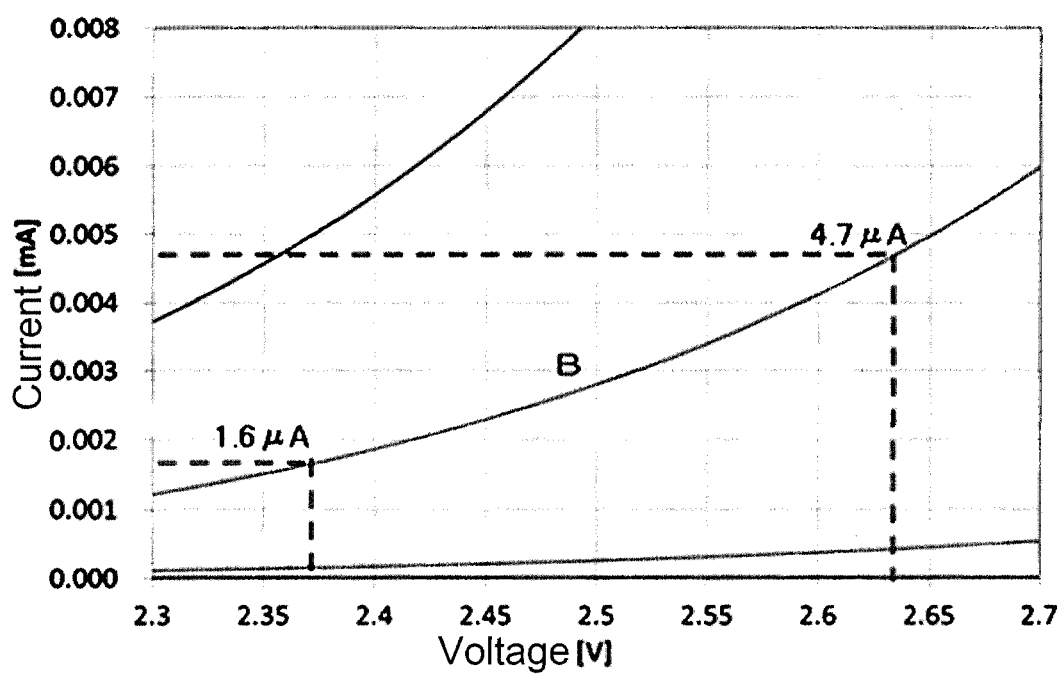
FIG. 4B is a diagram illustrating current-voltage characteristics of Zener diode B shown in FIGS. 2 and 3 in a range of 2.3 to 2.7 V.

As shown in FIG. 3, the Zener current of Zener diode B is 1.5 μA at a voltage of 2.36 V, and the time required for complete discharge of the unit cell having 3 mAh in a rest state is calculated to be approximately 83 days (i.e., 3 mAh/1.5 μA=2000 h=83.3 days). Two Zener diodes B are connected in parallel, respectively, to two unit cells 12 having a capacity of 3.0 mAh connected in series into an assembled battery 10 as shown in FIG. 2. In the case that the two unit cells have a difference of 10% in a state of charge (SOC) and the voltage of assembled battery reaches 5.0 V after constant-voltage charging, the voltages of two unit cells are respectively about 2.63 V and about 2.37 V as shown in FIG. 4A, and Zener currents corresponding to the two unit cells are respectively about 1.6 μA and about 4.7 μA as shown in FIG. 4B. In this case, a capacity (300 μAh) that corresponds to a 10% SOC in a total capacity of 3.0 mAh is divided by a difference of 3.1 (=4.7-1.6) μA between the Zener currents of the two cells to give approximately 97 hours (300 μAh/3.1 μA=96.7 h). That is, an imbalance in voltage between the two unit cells 12 can be eliminated after approximately 97 hours. In the assembled battery 10 of the present invention as seen in this case, the voltages of multiple unit cells 12 can change to be balanced over time even in a rest state without charge/discharge. As a result, the assembled battery 10 in the present invention can exhibit superior performance in balancing the voltages among multiple unit cells 12 constituting the assembled battery 10.

The Zener diode 14 is characterized in that a current of $1/200$ or less, preferably $1/500$ or less, of the capacity of unit cell 12 flows at a mean voltage of unit cell 12. The Zener diode 14 is typically characterized in that, although the lower limit of the current is not particularly limited, a current of $1/100$ or more of the capacity of unit cell 12 may flow at a mean voltage of unit cell 12. In addition, the mean voltage of unit cell 12 is preferably the average value of voltages at the states of charge (SOC) of 0%, 20%, 40%, 60%, 80%, and 100%. As described above, Zener diodes having various characteristics are commercially available, and a Zener diode that satisfies the above characteristics may be appropriately selected from commercially available products on specifications or experimental evaluations. For example, in the use of a unit cell having a mean voltage of 2.3 V and a capacity of 3 mAh, a Zener diode having a nominal Zener voltage (a breakdown voltage) of 5.1 V or more can be purchased and used (the nominal Zener voltage of 5.1 V or more indicates that only a small amount of current flows at a mean voltage of 2.3 V in the unit cell).

The number of lithium-ion unit cells 12 included in the assembled battery 10 may be two or more, and may be appropriately determined depending on the application so as to provide necessary output power. The number of lithium-ion unit cells 12 included in the assembled battery 10 is preferably 2 to 10, more preferably 2 to 6, further more preferably 2 to 4, particularly more preferably 2 to 3, most preferably 2. Such a reduction in the number of unit cells 12 can lead to a simple compact assembled battery 10 that take full advantage of the Zener diode, which is a very small and simple device. In other words, the simple compact assembled battery is suitable for applications requiring small lithium-ion batteries (i.e., applications that requires small, low-profile, and space-saving batteries), such as smart cards that incorporate small lithium-ion batteries (e.g., cards having fingerprint authentication/wireless communication functions provided with wireless communication ICs, ASICs for fingerprint analysis and fingerprint sensors), RFID tags that incorporate small lithium-ion batteries (e.g., RFID for management provided with IC circuits and antennas), and IoT modules that incorporate small lithium-ion batteries for, e.g., farm management, environmental management in factories and IC power supply.

The lithium-ion unit cell 12 has a length and a width each of preferably 50 mm or less, more preferably 7.5 to 50 mm, further more preferably 8 to 47.5 mm, particularly more preferably 10 to 46 mm. The lithium-ion unit cell 12 has a thickness of preferably 2 mm or less, more preferably 0.05 to 1.0 mm, further more preferably 0.1 to 0.8 mm, particularly more preferably 0.2 to 0.7 mm. Since the unit cell 12 has such a small size and thickness, the assembled battery 10 can be formed that takes full advantage of the Zener diode, which is a very small and simple device, and that is suitable for applications that small lithium-ion batteries are used (i.e., applications that requires small, low-profile, and space-saving batteries), such as smart cards that incorporate small lithium-ion batteries (e.g., cards having fingerprint authentication/wireless communication functions provided with wireless communication ICs, ASICs for fingerprint analysis and fingerprint sensors), RFID tags that incorporate small lithium-ion batteries (e.g., RFID for management provided with IC circuits and antennas), and IoT modules that incorporate small lithium-ion batteries for, e.g., farm management, environmental management in factories and IC power supply. Similar advantages can be achieved not only in such a low-profile unit cell but in a small coin-type unit cell.

The lithium-ion unit cell 12 has a capacity of preferably 50 mAh or less, more preferably 0.3 to 50 mAh, further more preferably 0.5 to 47 mAh, particularly more preferably 1 to 45 mAh. For the lithium-ion unit cell 12 having such a capacity range, a Zener diode that satisfies the above characteristics is readily and commercially available. In addition, the lithium-ion unit cell 12 having such a capacity range can be fitted to the size suitable for the use in a small lithium-ion battery (i.e., applications that requires small, low-profile, and space-saving batteries).

The lithium-ion unit cell 12 may have any general configuration of the secondary lithium-ion battery. The lithium-ion unit cell 12 preferably has a negative electrode composed of any one negative electrode active material selected from the group consisting of lithium titanate (LTO) and carbon. In the use of such a negative electrode active material, Zener diodes that satisfy the above characteristics are commercially available. A typical mean voltage of the lithium-ion unit cell 12 is 2.2 to 2.4 V (e.g., 2.3 V) in the case that the negative electrode contains lithium titanate (LTO), and a typical mean voltage of the lithium-ion unit cell 12 is 3.6 to 3.8 V (e.g., 3.7 V) in the case that the negative electrode contains carbon. Accordingly, suitable Zener diodes through which a current of $1/200$ or less of the capacity of unit cell 12 flows at such mean voltages of unit cells 12 may be selected from various commercially available Zener diodes.

In particular, the negative electrode preferably contains lithium titanate (LTO), and more preferably includes a lithium titanate (LTO) sintered plate as the negative electrode active material. The LTO sintered plate may be a known sintered plate as disclosed in PTLs 2 to 4. The use of LTO in the negative electrode can improve the cycle and storage characteristics in the assembled battery 10, and can further reduce variations in voltage and capacity among the unit cells 12. In particular, a secondary battery including the LTO negative electrode is characterized in that the voltage of battery sharply rises at the end of charge. This sharp rise in voltage indicates that a very small variation in capacity among multiple unit cells 12 of the assembled battery 10 causes a large difference in voltage, resulting in an advantage in that the Zener diodes 14 can readily balance the voltages among unit cells 12. The sharp rise in voltage is also advantageous in that a sufficient voltage balancing effect can be achieved even when the characteristics vary among multiple Zener diodes 14. In addition, the lithium-ion unit cell 12 including the LTO negative electrode can exhibit a low mean voltage (e.g., 2.3 V) as described above; hence, the unit cell unlikely undergoes deterioration (e.g., oxidation of an electrolytic solution), and Zener diodes that satisfy the above characteristics are further more readily selected from among various commercially available Zener diodes. In particular, a secondary lithium-ion battery produced with the LTO sintered plate exhibits high reliability, such as superior cycle characteristics and superior storage (small self-discharge) characteristics, and thereby the unit cells can be connected in series with a simple control.

A typical lithium-ion unit cell 12 includes a positive electrode and an electrolytic solution or a solid electrolyte. The positive electrode preferably contains a lithium complex oxide. Examples of lithium complex oxides include lithium cobaltate, lithium nickelate, lithium manganate, lithium nickel manganate, lithium nickel cobaltate, lithium cobalt nickel manganate, lithium cobalt manganate. The lithium complex oxide may contain at least one element selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W. The most preferred lithium complex oxide is lithium cobaltate ($LiCoO_2$). Accordingly, the positive electrode is particularly preferably a lithium complex oxide sintered plate, most preferably a lithium cobaltate sintered plate. A known electrolytic solution may be used that is generally incorporated in a secondary lithium battery. Alternatively, a solid electrolyte may be used in place of the electrolytic solution. A known lithium-ion conductive material generally incorporated in an all-solid-state lithium battery may be used as the solid electrolyte. Examples of such a solid electrolyte include a Li—La—Zr—O-based ceramic material and/or lithium phosphorus oxynitride (LiPON)-based ceramic material.

EXAMPLES

The present invention will be described in detail by the following examples.

Example 1

(1) Preparation of Negative Electrode Plate
(1a) Production of LTO Green Sheet
LTO powder A (a volume-based D50 particle size of 0.06 µm, available from Sigma-Aldrich Japan) (100 parts by weight), a dispersion medium (toluene: 2-propanol=1:1) (100 parts by weight), a binder (poly(vinyl butyral): product number BM-2, available from Sekisui Chemical Co., Ltd.) (20 parts by weight), a plasticizer (DOP: di(2-ethylhexyl) phthalate, available from Kurogane Kasei Co., Ltd.) (4 parts by weight), and a dispersant (product name: Rheodor SP-030, available from Kao Corporation) (2 parts by weight) were mixed. The resultant mixture of negative electrode raw material was stirred and defoamed under reduced pressure, and then the viscosity was adjusted to 4000 cP to prepare an LTO slurry. The viscosity was measured with an LVT viscometer available from Brookfield. The resulting slurry was formed on a PET film by a doctor blade process into an LTO green sheet. The thickness of LTO green sheet after drying was adjusted such that the thickness after firing was 80 µm.

(1b) Firing of LTO Green Sheet
The resultant green sheet was cut into a 25 mm square with a cutter knife and placed on an embossed zirconia setter. The green sheet on the setter was placed in an alumina sheath and held at 500° C. for five hours, and then heated at a rate of 200° C./h and fired at 800° C. for five hours. An Au film (a thickness of 100 nm) as a current collecting layer was formed on a face of the resultant LTO sintered plate by sputtering, the face being in contact with the setter, and the LTO sintered plate was then cut into a 10 mm by 10 mm square by a laser process.

(2) Preparation of Positive Electrode Plate
(2a) Production of Li(Co, Mg)$O_2$ Green Sheet
$Co_3O_4$ powder (a mean particle diameter D50 of 0.9 µm, available from Seido Chemical Industry Co., Ltd.), $Li_2CO_3$ powder (available from The Honjo Chemical Corporation) and $MgCO_3$ powder (available from Konoshima Chemical Co., Ltd.) were weighed and mixed such that $(Li_{1.02}Co_{0.98}Mg_{0.02})O_2$ was formed. The resultant mixture was held at 800° C. for five hours to give calcined powder. This calcined powder was pulverized in a pot mill until the mean particle diameter D50 reached 0.5 µm. The resultant powder (100 parts by weight), a dispersion medium (toluene: 2-propanol=1:1) (100 parts by weight), a binder (poly(vinyl butyral): product number BM-2, available from Sekisui Chemical Co., Ltd.) (10 parts by weight), a plasticizer (DOP: di(2-ethylhexyl) phthalate, available from Kurogane Kasei Co., Ltd.) (4 parts by weight), and a dispersant (product name: Rheodor SP-030, available from Kao Corporation) (2 parts by weight) were mixed. The resulting mixture was stirred and defoamed under reduced pressure, and then the viscosity was adjusted to 4000 cP to prepare a Li(Co,Mg)$O_2$ slurry. The viscosity was measured with an LVT viscometer available from Brookfield. The resultant slurry was formed on a PET film by a doctor blade process into an Li(Co,Mg)$O_2$ green sheet. The thickness of the green sheet after drying was 60 µm.

(2b) Production of Li(Co,Mg)$O_2$ Sintered Plate
The Li(Co,Mg)$O_2$ green sheet peeled from the PET film was cut into 50 mm square with a cutter knife. The green sheet was placed on the center of a bottom magnesia setter (a dimension of 90 mm square and a thickness of 1 mm) and covered with a top porous magnesia setter. A green sheet sandwiched between two setters were placed in a 120 mm square alumina sheath (available from Nikkato Co., Ltd.). At this time, the alumina sheath was not sealed and was capped with a gap of 0.5 mm. The resultant green sheet laminate was heated at a heating rate of 200° C./h to 600° C. and degreased for 3 hours, and then held at 800° C. for 20 hours for firing. After firing and then cooling down to room temperature, a fired plate was recovered from the alumina sheath to give a Li(Co,Mg)$O_2$ sintered plate as a positive electrode plate. The resultant positive electrode plate was cut into 9.5 mm by 9.5 mm square by a laser process.

(3) Assembling of Unit Cell
The Li(Co,Mg)$O_2$ sintered plate (positive electrode plate), a separator, and the LTO sintered plate (negative electrode plate) were stacked in sequence to prepare a laminate. The laminate was immersed in an electrolytic solution to produce a laminated unit cell. The electrolytic solution contains 1 mol/L $LiPF_6$ in an organic solvent composed of propylene carbonate (PC) and diethyl carbonate (DEC) in a ratio of 1:2. The separator was a porous single-layer cellulose film having a thickness of 25 µm (available from Nippon Kodoshi Corporation). Two lithium-ion unit cells were produced through these steps.

(4) Production of Assembled Battery

Zener diodes were connected to respective unit cells produced in Step (3) in parallel.

Each Zener diode was commercially available product that a current of 1/50,000 of the capacity of respective unit cell flows at a mean voltage of the unit cell. The value of 1/50,000 was calculated through dividing the current I (A) of Zener diode at the mean voltage of unit cell by the capacity C (Ah) of unit cell (i.e., I/C (unit: $h^{-1}$)), and is referred to as a Zener diode standard in the present specification. In addition, the mean voltage of unit cell was defined to be an average value of the voltages in the states of charge (SOC) of 0%, 20%, 40%, 60%, 80%, and 100% of the unit cell.

As described above, the two unit cells to which the Zener diodes are connected respectively were connected in series as shown in FIG. 1 to produce an assembled battery.

(5) Evaluation of Assembled Battery

The following properties were evaluated on the resultant assembled battery.

<Cycle Capacity Retention Rate>

A cycle capacity retention rate was calculated as a rate, i.e., $100 \times R_{ZC}/R_{NC}$ (%), of a capacity retention rate $R_{ZC}$ in a cycle test of assembled battery (including the Zener diodes) produced in Step (4) to a capacity retention rate $R_{NC}$ (this value was set to be 100) in a cycle test of unit cell (not including the Zener diode) produced in Step (3). In detail, the capacity retention rate $R_{NC}$ in the cycle test of the unit cell produced in Step (3) was calculated through dividing a discharge capacity $C_{3000}$ at 3000th cycle by a discharge capacity $C_1$ at 1st cycle in the cycle test, the cycling test including a repeated charge/discharge cycle composed of (a) constant-current charging at a rate of 1 C, (b) subsequent constant-voltage charging until a current value reached a rate of 0.2 C, and then (c) discharging at a rate of 1 C. The capacity retention rate $R_{ZC}$ in the cycle test of assembled battery produced in Step (4) was also calculated in the same manner as above, and the cycle capacity retention rate, $100 \times R_{ZC}/R_{NC}$ (%), was calculated.

<Storage Property>

A storage property was calculated as a rate, i.e., $100 \times R_{ZS}/R_{NS}$ (%), of a capacity retention rate $R_{ZS}$ in a storage test of assembled battery (including the Zener diodes) produced in Step (4) to a capacity retention rate $R_{NS}$ (this value was set to be 100) in a storage test of unit cell (not including the Zener diode) produced in Step (3). In detail, the unit cell produced in Step (3) was charged to a full charge state and discharged at 0.2 C to measure an initial capacity $C_0$, the similar unit cell fully charged was discharged at 0.2 C after storing at 25° C. for five days to measure a discharge capacity after storing $C_1$, and the capacity retention rate $R_{NS}$ (=$C_1/C_0$) in the storage test of unit cell was calculated through dividing the discharge capacity after storing $C_1$ by the initial discharge capacity $C_0$. The capacity retention rate $R_{BP}$ in the storage test of assembled battery produced in Step (4) was also calculated in the same manner as above, and the storage property, $100 \times R_{ZS}/R_{NS}$ (%), was calculated.

Example 2

An assembled battery was prepared and evaluated as in Example 1 except that commercially available Zener diodes used exhibited a current of 1/500 of the capacity of the respective unit cells at the mean voltage of the unit cells. The results are shown in Table 1.

Example 3

An assembled battery was prepared and evaluated as in Example 1 except that commercially available Zener diodes used exhibited a current of 1/200 of the capacity of the respective unit cells at the mean voltage of the unit cells. The results are shown in Table 1.

Example 4 (Comparative)

An assembled battery was prepared and evaluated as in Example 1 except that commercially available Zener diodes used exhibited a current of 1/50 of the capacity of the respective unit cells at the mean voltage of the unit cells. The results are shown in Table 1.

Example 5 (Comparative)

An assembled battery was prepared and evaluated as in Example 1 except that Zener diodes were not used. The results are shown in Table 1.

TABLE 1

| | Zener diode standard | Cycle capacity retention rate (Compared to unit cell) | Storage property (Compared to unit cell) |
| --- | --- | --- | --- |
| Ex. 1 | 1/50000 | 98% | 98% |
| Ex. 2 | 1/500 | 98% | 95% |
| Ex. 3 | 1/200 | 98% | 50% |
| Ex. 4* | 1/50 | 97% | 15% |
| Ex. 5* | none (0) | 30% | 98% |

*Comparative example

What is claimed is:

1. A lithium-ion assembled battery comprising:
    a plurality of battery sub-circuits connected in series;
    wherein each battery sub-circuit consists of a first parallel branch and second parallel branch, the first parallel branch comprising a lithium-ion unit cell, and the second parallel branch comprising a Zener diode; and
    wherein the Zener diode is characterized in that a current of 1/200 or less of a capacity of the unit cell flows at a mean voltage of the unit cell.

2. The lithium-ion assembled battery according to claim 1, wherein the lithium-ion unit cell includes a negative electrode that contains a negative electrode active material selected from the group consisting of lithium titanate and carbon.

3. The lithium-ion assembled battery according to claim 2, wherein the mean voltage is 2.2 to 2.4 V in the case that the negative electrode contains the lithium titanate, and the mean voltage is 3.6 to 3.8 V in the case that the negative electrode contains the carbon.

4. The lithium-ion assembled battery according to claim 1, wherein a negative electrode of the lithium-ion unit cell contains a lithium titanate as a negative electrode active material.

5. The lithium-ion assembled battery according to claim 4, wherein the negative electrode contains a lithium titanate sintered plate.

6. The lithium-ion assembled battery according to claim 1, wherein the unit cell includes a positive electrode containing a lithium complex oxide, and an electrolytic solution or a solid electrolyte.

7. The lithium-ion assembled battery according to claim 1, wherein the lithium-ion unit cell has a length of 50 mm or less, a width of 50 mm or less, and a thickness of 2 mm or less.

8. The lithium-ion assembled battery according to claim 1, wherein the lithium-ion unit cell has a capacity of 50 mAh or less.

9. The lithium-ion assembled battery according to claim 1, wherein the number of the lithium-ion unit cells included in the assembled battery is two.

* * * * *